Patented Oct. 12, 1943

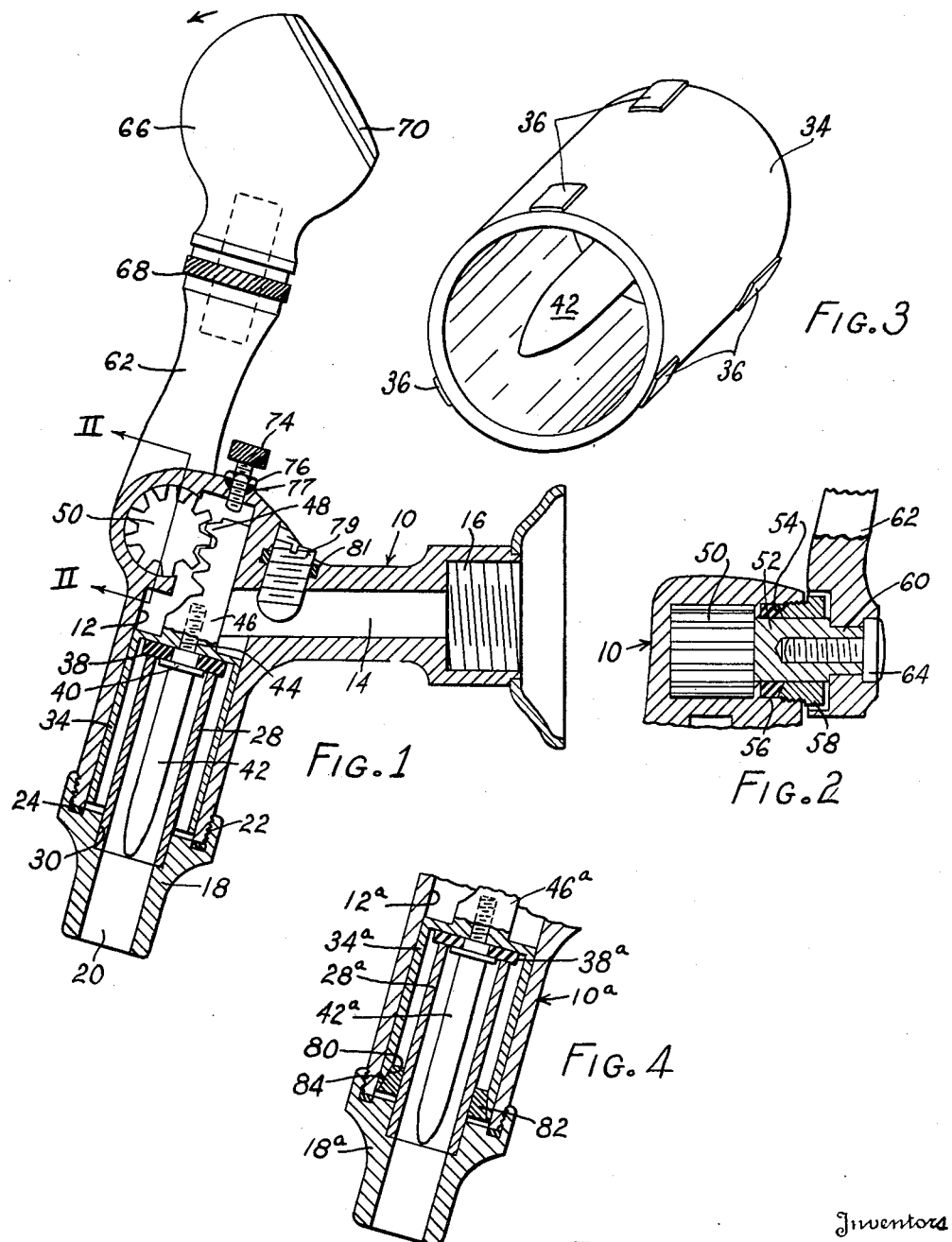

2,331,527

UNITED STATES PATENT OFFICE 2,331,527

FAUCET

Frank B. Welty, Youngstown, and Raymond D. Welty, Canfield, Ohio

Application June 3, 1941, Serial No. 396,388

11 Claims. (Cl. 225—6)

This invention relates to means for controlling the flow and dispensing of fluids, and, more particularly, is concerned with faucets for controlling the dispensing of liquids under pressure and containing entrapped gas, for example carbon dioxide, and specifically, is concerned with the dispensing of beer. Although the present invention is broadly applicable to controlling the flow of substantially any fluids or liquids, our invention is particularly concerned with the handling and dispensing of beer, and, accordingly, will be hereinafter so described.

Beer manufactured and sold today contains a suitable amount of carbonating gas, such as carbon dioxide, for example 2.5 parts by volume, so that the beer has sparkle, life, and taste. If the carbonating material is allowed to escape from the beer during dispensing, or in any other way, the beer is "flat" and is deemed unsatisfactory by the customer. In order to keep the carbonating gas in the beer thirty to thirty-five pounds of pressure per square inch must be applied to the beer at seventy degrees Fahrenheit, and in accordance with known gas-pressure laws, if the temperature is increased the pressure must be increased, and if the temperature is decreased the pressure can be decreased. For example, at forty degrees Fahrenheit only approximately twelve pounds pressure on the beer is required.

Heretofore, a great deal of trouble has been experienced in dispensing beer held under pressure through known types of faucets. If the faucet permits the beer to flow directly from the relatively high storage pressure to atmospheric pressure the beer will foam, spit or spray which is not only an annoyance to the bartender attempting to fill a glass full of beer instead of foam, but the beer drawn is apt to be "flat" and unsatisfactory to the customer. In addition, the dispensing of the beer is time consuming and wasteful due to the large amount of foam formed.

Prior to our invention, it has been known that if the pressure on the stored beer can be dropped to substantially atmospheric pressure at the dispensing faucet that a gravity flow of the beer from the faucet results which is reasonably free from foam, spraying and spitting. It has been proposed to achieve such a flow by passing the beer from the storage keg through a relatively long vertically extending tube which causes a pressure drop proportional to the length of the tube. However, with apparatus of this type we have found that the considerable pressure drop in the line may permit part of the carbonated gas in the beer to free itself from the liquid and come out of the dispensing faucet as gas pockets and bubbles which causes a very undesirable sputtering at the faucet. Also, if a relatively long small bore tube is used which extends substantially horizontally, with the small bore of the tube acting as a flow restricter, then when the faucet is shut off the pressure builds up in the restricted tube clear to the faucet so that foaming at the faucet still results when beer is first drawn.

Various efforts and attempts have been made to provide a dispensing faucet for beer and the like, and in which a pressure drop is achieved directly at the faucet so that a controlled gravity flow of the beer from the faucet free of foam is obtained. Although faucets of this general type have gone a long way to solve the existing difficulties, nevertheless, there is still room for considerable improvement. Heretofore, it has been difficult to produce a faucet which can provide the same type of pressure drop in the faucet regardless of the degree to which the faucet is opened. Also, it has been difficult to prevent air from mingling with the beer when it passes out substantially as a hollow tube beneath the usual ring type valve seat associated with the faucet. Further, the liquid traps associated with certain known prior styles of faucets are subject to improvement. Another difficulty with known types of pressure dropping faucets has been that they are apt to be expensive and complicated to construct and maintain in operation.

It is the general object of our invention to avoid and overcome the foregoing and other difficulties of and objections to flow control means and particularly faucets by the provision of a relatively simple, inexpensive, easily operated, and long wearing faucet in which substantially the same pressure dropping characteristics are retained regardless of the degree to which the faucet is opened, and which is particularly satisfactory for the dispensing of beer or other carbonated beverages without undesirable foaming or loss of carbonation of the beverage.

Another object of our invention is to provide a faucet of the character indicated and wherein an improved liquid trap is provided.

Another object of our invention is to provide a pressure relief type of dispensing faucet wherein the valve associated therewith is operated by rack and gear means.

Another object of our invention is the provision of a beer dispensing faucet wherein air displacement means are provided so that beer flows from the nozzle of the faucet as a round solid stream free of air.

Another object of our invention is to provide readily adjustable means for controlling the degree to which the faucet can be opened.

Another object of our invention is the provision of a dispensing faucet of the character indicated, and wherein adjustable pressure relief means are incorporated.

Another object of the invention is to provide a faucet capable of providing the same smooth outlet flow regardless of widely different inlet pressures.

The foregoing and other objects of our invention are achieved by the provision of a faucet for dispensing liquids comprising a casing having a bore connecting an inlet and an outlet, a cup slidably received within the bore and having the bottom of the cup toward the inlet end of the bore, said cup restricting the flow of liquid through the bore, a tube carried in sealed relation by the outlet end of the casing and extending inside of the cup but in spaced relation to the side walls thereof, means associated with the bottom of the cup for sealing with the end of the tube, means moving the cup to and from sealing relation with the tube, and means carried by the cup and extending inside the tube for preventing the flow of air axially of the liquid passed through the sealing means. The means for moving the cup in the cylindrical bore ordinarily comprise a rack and pinion, and any event operate to quickly open the faucet upon a relatively small movement of the operating handle. Means are associated with the faucet for adjustably limiting the opening movement of the sealing means or valve.

For a better understanding of my invention reference should be had to the accompanying drawing wherein Fig. 1 is a longitudinal sectional view through a typical faucet embodying the principles of our invention; Fig. 2 is a cross-sectional view taken on line II—II of Fig. 1; Fig. 3 is a perspective view of the cup incorporated in the apparatus; and Fig. 4 is a fragmentary sectional view similar to Fig. 1, but illustrating a modification of the invention.

In the drawing, the numeral 10 indicates a casing having a bore 12 therein which is conveniently made cylindrical in form. The casing 10 includes an inlet 14 which extends to the upper end of the bore 12, and the inlet has associated therewith means 16 whereby the casing can be secured to an inlet conduit. A nozzle or cap 18 having an aperture 20 therein is secured to the outlet end of the casing 10 remote from the inlet 14. This is conveniently accomplished by cooperating threads 22 formed on the casing and the nozzle 18 as illustrated in Fig. 1. A sealing gasket 24 is ordinarily recessed into the end of the nozzle 18 so that the end of the casing 10 seals against the gasket when the nozzle is secured to the casing.

The nozzle 18 carries a tube 28 which is secured in sealed relation with the nozzle, for example, by a forced fit in a counterbore 30 formed in the nozzle. The passage through the center of the tube 28 forms a continuation of the aperture 20 in the nozzle 18, as will be evident from the drawing.

The flow restricting member associated with the faucet takes the form of an inverted cup 34 which is slidably received within the cylindrical bore 12 of the casing 10. The outer periphery of the cup 34 is provided at each end with a plurality of circumferentially spaced spacers 36 which hold the side walls of the cup 34 a small distance from the inner wall of the bore 12 so that the desired flow restricting effect is achieved by the cup 34. When handling beer the spacers 36 are of a size to give a clearance of between .010 to about .012 inch between the cup and bore. The spacers 36 have not been shown in Fig. 1 because they are of such small size.

Associated with the bottom of the cup 34 are means for sealing between the cup and the end of the tube 28. These means may comprise a flat disk or washer 38 of suitable gasket material, such as leather or rubber, and the disk 38 is held in place by a flange 40 formed on or secured to a filler plug 42 positioned axially of the cup 34 and secured by a threaded stem 44 to a post 46 which is conveniently made integral with the cup 34.

The means for moving the cup 34 in the bore 12 may take a plurality of forms, but we have found that certain advantages reside in the use of rack and pinion means for accomplishing the movement. Particularly, the post 46 is formed with a rack 48 which engages with a pinion 50 received within a suitable recess in the casing 10. The pinion 50 is secured to a stub shaft 52 which extends out laterally of the casing 10 through a suitable aperture 54 which is machined and threaded to receive suitable packing 56 and a gland nut 58. The end of the stub shaft 52 is squared, as at 60, and a handle 62 is secured to the squared end of the shaft by a cap screw 64. The handle 62 may have an operating knob 66 removably secured thereto by suitable means 68 so that the knob 66 can be adjusted to any desired position so that advertising or the like carried by the face 70 of the knob can be read.

Means for adjustably limiting the opening movement of the faucet are preferably incorporated therewith, and the means may comprise an adjustable screw 74 received in a suitably tapped opening in the casing 10 and having an end extending into engagement with the end of the post 46 to limit movement of the post and the cup 34 associated therewith. A lock nut 76 and a sealing gasket 77 may be incorporated with the adjusting screw 74.

Further, we may include a flow restricting means of adjustable character at either the inlet or outlet or both of the faucet. Specifically, additional flow restricting means of the type indicated are ordinarily not required when the faucet is employed to dispense beer or other carbonated beverage. However, when the faucet is employed to dispense liquids, such as water, which may be supplied to the faucet under widely different pressures, then the additional flow restricting means are very advantageous. For example, the water pressure at or near the top of a building or in a high part of a given city may be many pounds lower per square inch than the pressure near the bottom of the building or in a low part of the city. It is not unusual for the water pressure to vary in different locations from 30 pounds per square inch to 150 pounds per square inch. Obviously, if the same pressure dropping faucet is used in each installation the action of the faucet will be considerably different.

Accordingly, in the drawing we have illustrated a separate pressure dropping means in association with our improved faucet and which is conveniently positioned at the inlet side of the faucet. Although the pressure dropping means may take a variety of forms, as for example, a petcock or other valve, we have shown a flow-restricting screw 79 received in a tapped opening in the casing 10 and extending into the inlet 14. A gasket 81 may be employed to prevent flow of fluid around the screw 79 if this be found necessary.

In the use of the faucet under varying inlet pressures the screw 79 is adjusted to provide a greater or less flow-restricting action so that the faucet operates to give the same smooth flow of liquid from the outlet side regardless of the inlet pressure.

In the operation of our improved faucet, and with the parts shown in the position of Fig. 1 the faucet is closed and no liquid can pass from the inlet 14 out of the nozzle 18. When it is desired to open the faucet to allow the flow of liquid therethrough the knob 66 is grasped by the operator and is moved to the left in the direction shown by the arrow. This movement turns pinion 50 to raise rack 48, post 46 and cup 34 toward the inlet end of the bore 12. Liquid can now flow through the inlet 14 down between the bore 12 and the outer periphery of the cup 34, up between the inner wall of the cup 34 and the outer wall of the tube 28, between the sealing disk 38 and the end of the tube and out through the center of the tube 28 and the aperture 20 in the nozzle 18. It will be seen that the tube 28 acts in conjunction with the remaining parts of the structure to form a ring-shaped liquid trap which smooths out the flow of liquid and reduces foaming and spitting of the liquid. Specifically, the fluid sprays out between the bore 12 and the cup 34 but the spray is smothered in the liquid held in the trap so that foaming of the liquid is prevented. Also, it will be seen that the spray must reverse its direction which further reduces its foaming characteristics.

The filler plug 42 positioned at the center of the tube 28 acts to fill up the space in the center of the tube which would contain air because the flow of the liquid between the disk 38 and the end of the tube 28 is often in the form of a hollow tube of liquid. In this manner trapping of air in the liquid as it flows down the tube 28 and out of the nozzle 18 is largely avoided and the liquid passes from the aperture 20 of the nozzle 18 in the form of a solid stream.

The degree of valve opening between the sealing disk 38 and the end of the tube 28 is controlled by adjusting the screw 74 so that the exact type of flow desired for any pressure condition on the liquid is obtained when the lever 62 is turned to the fully open position and the end of the post 46 abuts against the screw 74. However, it should be noted here that the gear and rack opening means, for the valve comprising the disk 38 and the end of the tube 28, operate to move the valve to the full limit of its open position upon a relatively short movement of the lever 62. This is advisable as it causes the operator to almost always fully open the valve which reduces spraying and foaming at the valve.

To shut off the flow of liquid the lever 62 is returned to the position shown in Fig. 1 at which time the sealing disk 38 engages in sealing relation with the end of the tube 28. It will be recognized that with the parts in the position shown in Fig. 1 of the drawing that liquid under pressure will be contained in the liquid trap space between the outside of the tube 28 and the inside of the cup 34. This liquid is of such a relatively small volume that undesirable foaming does not occur when the faucet is first opened.

The modified form of our invention shown in Fig. 4 is similar in substantially all respects to the form of the invention shown in Figs. 1 and 3 and already described. Similar parts in Fig. 4 have been identified by the same numerals used to identify the same parts in Figs. 1 and 3 except that the suffix "a" has been added. The one difference between the form of the invention shown in Fig. 4 and that illustrated in the remaining figures in the drawing is that the modification of Fig. 4 includes means for varying the flow restricted means in the faucet. Specifically, the inner periphery of the end of the cup 34a is beveled, as at 80, and a collar 82 is secured to the tube 28a. The collar 82 has a beveled surface 84 which is complementary to the bevel 80 on the end of the cup 34a. The angle of the bevel of the surfaces 80 and 84 and the clearance therebetween is such that when the faucet is opened completely with the screw 74 in a retarded position the clearance between the surfaces 80 and 84 will be greater than the clearance between the cylindrical bore 12a and the outer periphery of the cup 34a. However, by adjusting the screw 74 to any desired position the clearance between the surfaces 80 and 84 can be dropped below the clearance between the cylindrical bore 12a and the outer periphery of the cup 34a. Thus, the valve or faucet can be adjusted to provide any type of flow restricting action desired and is capable of use with a variety of liquids and under any given installation conditions.

From the foregoing it will be recognized that the objects of our invention have been achieved by the provision of an improved faucet for dropping pressures and dispensing liquids, such as beer, without undesirable foaming, spraying or spitting and while retaining a large proportion of the carbonation therein. The rack and gear means for operating the faucet serves as a positive lock when the faucet is closed, and provide means for rapidly and with a small movement completely opening and closing the faucet. The faucet includes a liquid trap of relatively small volume, and means incorporated in the faucet provide for quickly adjusting the degree or amount of flow through the faucet. The trapping of air in the flow of liquid from the faucet is largely overcome, and the faucet is relatively inexpensive to construct and maintain in operation over long periods. The flow restricting means are positioned between the inlet for the faucet and the shut-off valve and the valve closes with and opens against the liquid pressure which aids in keeping the faucet tight against leakage when it is closed. The flow of liquid when in a low pressure area, volume, or chamber is not agitated and foaming is avoided.

While in accordance with the Patent Statutes we have specifically illustrated and described our invention, it should be particularly understood that we are not to be limited thereto or thereby, but that the scope of our invention is defined in the appended claims.

We claim:

1. A faucet for dispensing beer and the like and comprising a casing having a cylindrical bore, a nozzle secured to one end of the casing, a tube having its outer periphery secured in sealing relation with the nozzle and extending back into the bore in spaced relation to the wall thereof, a cylindrical cup slidably and loosely carried within the bore, the open end of the cup being toward the nozzle, means including a rack and pinion for moving the cup longitudinally of the bore, adjustable means for limiting such movement, means associated with the bottom of the cup for sealing with the end of the tube, a filler plug carried by the cup and extending through the center of the tube, and means associated with the casing for securing an inlet conduit to the end of the casing bore remote from the nozzle.

2. A faucet for dispensing beer and the like and comprising a casing having a bore, a nozzle associated with one end of the casing, a tube having its outer periphery secured in sealing relation with the nozzle and extending back into the bore in spaced relation to the wall thereof, a flow restricting cup slidably carried within the bore, means for moving the cup longitudinally of the bore, means associated with the cup for sealing with the end of the tube, and means associated with the casing for securing an inlet conduit to the end of the casing bore remote from the nozzle.

3. A faucet for dispensing liquids comprising a casing having a cylindrical bore connecting an inlet and an outlet, a cup slidably received within the bore and having the bottom of the cup toward the inlet end of the bore, said cup restricting the flow of liquid through the bore, a tube carried in sealed relation by the outlet end of the casing and extending inside of the cup but in spaced relation to the side walls thereof, means associated with the bottom of the cup for sealing with the end of the tube, means for moving the cup to and from sealing relation with the tube, and means carried by the cup and extending inside the tube for preventing the flow of air axially of the liquid passed through the sealing means.

4. A faucet for dispensing liquids comprising a casing having a bore connecting an inlet and an outlet, flow restricting means slidably received within the bore, a tube carried in sealed relation by the outlet end of the casing and extending inside of the casing but in spaced relation to the side walls thereof, valve means associated with the flow restricting means for sealing with the end of the tube, and means for moving the flow restricting means to move the valve means to and from sealing relation with the tube.

5. In combination in a faucet, a casing having a longitudinal passage extending at considerably less than a right angle to the vertical, means for connecting an inlet conduit to the upper end of the passage, a tube extending into the passage from the lower end thereof, means sealing the outside of the tube to the walls of the lower end of the casing passage, flow restricting means positioned in the passage, sealing means adapted to engage with the upper end of the tube to seal the flow of liquid through the faucet, and means for moving the sealing means, to and from sealing relation with the upper end of the tube.

6. A faucet for dispensing liquids comprising a casing having a substantially cylindrical passage extending substantially vertically therethrough, a tube extending up into the passage and secured to the walls of the lower end of the passage so as to provide a ring-shaped trap for liquids, a flow-restricting inverted cup positioned in the passage and having the sides of the cup extending down into the liquid trap, means associated with the cup for sealing with the tube, means for displacing fluid from the axis of the tube, rack and gear means for moving the cup longitudinally of the passage, and means for adjustably limiting such movement.

7. In combination in a faucet, a casing having a substantially vertical passage therethrough, substantially circular flow-restricting means positioned in the passage, a substantially circular liquid trap associated with the passage and into which the liquid is discharged as it flows from the flow-restricting means, sealing means associated with the passage at the outlet end of the liquid trap, means for moving the sealing means to open or close the faucet, and means for displacing air from the center of liquid passing through the sealing means.

8. In combination in a faucet, a casing having a substantially vertical passage therethrough, substantially circular flow-restricting means positioned in the passage, a substantially circular liquid trap associated with the passage centrally of the flow-restricting means and into which the liquid is discharged as it flows from the flow-restricting means, sealing means associated with the passage at the outlet end of the liquid trap, and means for moving the sealing means to open or close the faucet.

9. A faucet for dispensing liquids comprising a casing having a substantially cylindrical passage extending substantially vertically therethrough, a tube extending up into the passage and secured to the walls of the lower end of the passage so as to provide a ring-shaped trap for liquids, a flow-restricting inverted cup positioned in the passage and having the sides of the cup extending down into the liquid trap, and means associated with the cup for sealing with the tube.

10. A faucet for dispensing liquids comprising a casing having a substantially cylindrical passage extending substantially vertically therethrough, a tube extending up into the passage and secured to the walls of the lower end of the passage so as to provide a ring-shaped trap for liquids, flow-restricting means slidably positioned in the passage, and means carried by the flow restricting means and adapted to seal with the upper end of the tube.

11. A faucet for dispensing liquids comprising a casing having a substantially cylindrical passage extending substantially vertically therethrough, a tube extending up into the passage and secured to the walls of the lower end of the passage so as to provide a ring-shaped trap for liquids, an inverted cup slidably received in the passage and extending down into the liquid trap, and means for sealing the end of the tube upon movement of the cup.

FRANK B. WELTY.
RAYMOND D. WELTY.